United States Patent [19]

Shaner et al.

[11] 4,111,887

[45] Sep. 5, 1978

[54] REINFORCED POLYOXYMETHYLENE MOLDING COMPOSITION CAPABLE OF FORMING COMPOSITE ARTICLES EXHIBITING IMPROVED PHYSICAL PROPERTIES

[75] Inventors: Jay R. Shaner, Plainfield, N.J.; Robert Edelman, Staten Island, N.Y.

[73] Assignee: Celanese Corporation, New York, N.Y.

[21] Appl. No.: 846,663

[22] Filed: Oct. 28, 1977

Related U.S. Application Data

[63] Continuation-in-part of Ser. No. 751,850, Dec. 17, 1976, abandoned.

[51] Int. Cl.² ............................................. C08L 71/02
[52] U.S. Cl. ........................... 260/37 AL; 260/45.9 D
[58] Field of Search .................... 260/37 AL, 45.9 DI

[56] References Cited

U.S. PATENT DOCUMENTS

| | | | |
|---|---|---|---|
| 3,135,718 | 6/1964 | Wagner et al. | 260/67 FP |
| 3,170,896 | 2/1965 | Wagner et al. | 260/67 FP |
| 3,455,867 | 7/1969 | Berardinelli et al. | 260/37 AL |

FOREIGN PATENT DOCUMENTS 993,600  5/1965  United Kingdom ............. 260/45.9 DI

*Primary Examiner*—Lewis T. Jacobs
*Attorney, Agent, or Firm*—Kenneth A. Genoni

[57] ABSTRACT

An improved fiber reinforced polyoxymethylene molding composition is provided which when molded forms a composite article having improved physical properties (e.g., tensile strength and Izod impact strength). In admixture with the polyoxymethylene polymer and fibrous reinforcement (e.g., glass fiber) is provided a minor amount (as defined) of a certain polycarbodiimide (as defined) or a combination of the polycarbodiimide and a high molecular weight thermoplastic phenoxy resin. It is believed that the polycarbodiimide either alone or in combination with the thermoplastic phenoxy resin functions primarily by a complex mechanism which is incapable of simple explanation to enhance the adhesion between the chemical functionality of the oxymethylene polymer chain and the fibrous reinforcement.

20 Claims, No Drawings

REINFORCED POLYOXYMETHYLENE MOLDING COMPOSITION CAPABLE OF FORMING COMPOSITE ARTICLES EXHIBITING IMPROVED PHYSICAL PROPERTIES

CROSS-REFERENCE TO RELATED APPLICATION

This is a continuation-in-part of U.S. Ser. No. 751,850, filed Dec. 17, 1976 now abandoned.

BACKGROUND OF THE INVENTION

The present invention relates to improved fiber reinforced polyoxymethylene molding compositions. More specifically, this invention relates to fiber reinforced polyoxymethylene molding compositions which form composite articles of improved physical properties.

As is well known, polyoxymethylene, or polyacetal, is a thermoplastic resin which finds wide utility in the manufacture of molded articles. Molded articles of exceptional strength and toughness are obtained when the polyoxymethylene resin is intimately combined with various reinforcing agents. It has been found, however, that various additives are required to provide the desired physical properties to the molded articles prepared from the reinforced polyoxymethylene polymers. Inferior physical properties commonly can be traced to poor adhesion between the polyoxymethylene polymer and the fibrous reinforcement.

Thus, for example, reinforced polyoxymethylene polymers as described in U.S. Pat. No. 3,455,867 provide increased strength in molded articles through the use of chemical coupling agents.

Polyoxymethylene compositions containing certain carbodiimides are disclosed in British Pat. No. 993,600 where the carbodiimides primarily serve an anti-aging role. The patent broadly suggests the use of mono- and polycarbodiimides, but the specific working examples are limited to the use of severely hindered carbodiimides such as 2,6,2',6'-tetraisopropyldiphenylcarbodiimide and the polycarbodiimide of 1,3,5-triisopropylbenzene-2,4-diisocyanate.

U.S. Pat. No. 3,901,846 discloses that the incorporation of small amounts of specific high molecular weight phenoxy resins in intimate mixtures of the polyoxymethylene polymers and reinforcing agents provides the desired improved physical properties as well as improved surface effects in molded articles.

The non-analogous use of carbodiimides in the preparation of polyoxymethylene polymers is also disclosed in U.S. Pat. Nos. 3,170,896 and 3,135,718.

In the past certain polycarbodiimides have been employed as heat and hydrolysis stabilizers for polyesters as well as in a variety of other areas as illustrated in U.S. Pat. Nos. 3,193,522; 3,193,523; 3,296,190; 3,575,931; and 3,835,098; U.S. Ser. No. 715,946, filed Aug. 19, 1976 now U.S. Pat. No. 4,071,503, Jan. 31, 1978, U.S. Ser. No. 753,384, filed Dec. 22, 1976; British Pat. Nos. 1,056,202; 1,231,975; and 1,330,036; Japanese Document No. 75-00044 (summarized in Chemical Abstract, 172327W, Vol. 82, 1975); Belgian Pat. No. 626,176 (summarized in Chemical Abstract, 2054f, Vol. 61, 1964); and *Preparation of Carbodiimides from Isocyanates*, by W. Neumann and P. Fischer, 1 Agnew. Chem. Internat. Edit. 625 (1962).

In light of this prior art, it is an object of the present invention to provide an improved reinforced polyoxymethylene molding composition capable of forming composite articles exhibiting improved physical properties.

It is another object of this invention to provide reinforced polyoxymethylene composite articles having physical properties which are superior to those of the phenoxy modified fiber reinforced polyoxymethylene articles of the prior art.

It is yet another object of this invention to provide polyoxymethylene molded articles of improved physical properties employing a specifically defined class of polycarbodiimide not employed heretofore in the art to modify the reinforced polyoxymethylene molding resins.

These and other objects of the invention will become apparent from the following summary and description of preferred embodiments.

SUMMARY OF THE INVENTION

According to the present invention it has now been found that a particular class of polycarbodiimides, particularly, unhindered aromatic polycarbodiimides having up to one methyl substituent per aromatic ring and having at least three carbodiimide groups per molecule, improve the physical properties of the resulting fiber reinforced composite articles when combined with the polyoxymethylene and fibrous reinforcement in an amount of about 0.5 to 5 percent by weight based on the total weight of the composition.

In another aspect of the invention it has been found that the polycarbodiimide, when employed in combination with a high molecular weight thermoplastic phenoxy resin which has heretofore been known in the art to improve the physical properties of reinforced polyoxymethylene polymers, provides a synergistic improvement in the physical properties of the reinforced polyoxymethylene composite articles; particularly glass-reinforced polyoxymethylene articles.

DESCRIPTION OF PREFERRED EMBODIMENTS

As used herein the term "polyoxymethylene" is intended to include both homopolymers, including so-called capped homopolymers, i.e., acylated homopolymers, as well as copolymers. Such polymers which may be produced according to methods well-known in the art, have recurring —$OCH_2$— units and are typically prepared by the polymerization of anhydrous formaldehyde or by the polymerization of trioxane.

Particularly useful in this invention is polyoxymethylene copolymer having at least one chain containing recurring oxymethylene (—$OCH_2$—) units interspersed with —OR— groups in the main polymer chain where R is a divalent radical containing at least two carbon atoms directly linked to each other and positioned in the chain between the two valences with any substituents on said R radical being inert, i.e., substituents which will not induce undesirable reactions. Preferred copolymers contain from about 60 to about 99.6 mole percent of recurring oxymethylene groups. In a preferred embodiment R may be, for example, an alkylene or substituted alkylene group containing at least two carbon atoms.

Among the copolymers which are utilized in accordance with the invention are those having a structure comprising recurring units of the formula:

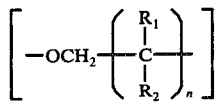

wherein $n$ is zero or an integer of from 1 to 5, and wherein $n$ is zero in from 60 to 99.6 percent of the recurring units. $R_1$ and $R_2$ are inert substituents, that is, substituents which will not cause undesirable reactions.

A preferred class of copolymers are those having a structure comprising recurring units wherein from 60 to 99.6 percent of the recurring units are oxymethylene units. These copolymers are prepared by copolymerizing trioxane with a cyclic ether having the structure:

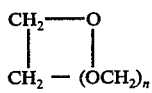

where $n$ is 0, 1 or 2.

Examples of other preferred polymers include copolymers of trioxane and cyclic ethers containing at least two adjacent carbon atoms such as the copolymers disclosed in U.S. Pat. No. 3,027,352.

Among the specific ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred polymers utilized in accordance with the invention are moldable thermoplastic materials having a weight average molecular weight of at least about 35,000, a melting point of at least about 150° C., and an inherent viscosity of at least about 0.8 (measured at 60° C. in a 0.1 weight percent solution in p-chlorophenol containing 2 weight percent of alpha-pinene).

Commonly the polyoxymethylene polymer is prestabilized to a substantial degree. Such stabilization may take the form of stabilization by degradation of the molecular ends of the polymer chain to a point where a relatively stable carbon-to-carbon linkage exists at each end. For example, such degradation may be effected by melt hydrolysis such as that disclosed in U.S. Pat. No. 3,318,848, or by solution hydrolysis such as that described in U.S. Pat. No. 3,219,623. Mixtures of polyoxymethylene polymers stabilized by melt hydrolysis and by solution hydrolysis may, of course, be used. The polyoxymethylene may also include conventional stabilizers such as an antioxidant and/or an acid scavenger. Generally, these stabilizers will be present in a total amount of less than about 3 percent by weight based on the weight of the polyoxymethylene polymer.

The polycarbodiimides which may be used in the present invention are selected from a particularly defined group. It has been found that only those polycarbodiimides which both (a) are derived from one or more aromatic diisocyanates which are either unsubstituted or contain up to one methyl substituent on each aromatic ring, and (b) contain at least three carbodiimide units per polycarbodiimide molecule will achieve the desired result. It is believed that the specific polycarbodiimide defined herein either alone or in combination with the thermoplastic phenoxy resin functions primarily by a complex mechanism which is incapable of simple explanation to enhance the adhesion between the chemical functionality of the oxymethylene polymer chain and the fibrous reinforcement. Carbodiimides having less than three carbodiimide units per polycarbodiimide molecule are not suitable for use in the percent composition because they are too volatile for practical use at the temperatures typically encountered in a molding, e.g., injection molding, operation and may tend to exude during molding. Additionally, such carbodiimides tend not to mix well with the polyoxymethylene.

The polycarbodiimide should be such that it is miscible with the polyoxymethylene polymer in the molten state. The polycarbodiimide useful in the present invention may have number average molecular weights of generally from about 450 to about 10,000 typically from about 800 to about 8,000, and preferably from about 1,000 to about 6,500. Polycarbodiimides having molecular weights greater than about 10,000 may not dissolve in the poloxymethylene melt and thus may not be useful in the present invention.

Polycarbodiimides which are useful in the present invention typically include poly(tolyl carbodiimide), poly(4,4'-diphenylmethane carbodiimide, poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), and mixtures thereof. Preferred polycarbodiimides include poly(tolyl carbodiimide), poly(4,4'-diphenylmethane carbodiimide), and mixtures thereof. The poly(4,4'-diphenylmethane carbodiimide) is particularly preferred because its carbodiimide groups are most readily available for interaction between the oxymethylene polymer and the fibrous reinforcement. Additionally, it imparts only a light yellow color to the blend. The poly(tolyl carbodiimide) has slightly less available carbodiimide groups and imparts a more intense color to the blends.

The polycarbodiimide may be prepared in any manner known to those skilled in the art, for example, by heating the aromatic diisocyanate compounds defined above in the presence or absence of a solvent. The formation of the polycarbodiimide is accompanied by the evolution of carbon dioxide gas.

Although the polycarbodiimides useful in the present invention may be prepared without the use of the catalyst, much higher temperatures (ca 300° C.) are needed in the absence of a catalyst. For certain polycarbodiimides, the use of such high temperatures may result in the formation of large quantities of side products and colored products. Thus, the polycarbodiimides may be typically prepared by heating the isocyanates in the presence of a catalyst such as the phosphorus containing catalysts described in U.S. Pat. Nos. 2,853,473, 2,663,737, and 3,755,242, and also in Monagle, J. Org. Chem. 27, 3851 (1962). Phospholine oxides such as those described in Campbell et al., J. Amer. Chem. Soc. 84, 3673 (1962) are preferred catalysts. A particularly preferred catalyst is 1-ethyl-3-methyl-3-phospholine-1-oxide.

The polycarbodiimide formation reaction is preferably carried out under an atmosphere of argon or other dry inert gas so as to minimize the amount of water which may be in contact with the reactants since isocyanates tend to react rapidly with water at elevated temperatures.

Aromatic diisocyanates which may be used in preparing the desired polycarbodiimides include, for example, toluene diisocyanate, 4,4'-diphenylmethane diisocyanate, 3,3'-dimethyl-4,4'-biphenylene diisocyanate, p-phenylene diisocyanate, m-phenylene diisocyanate, 3,3'-dimethyl-4,4'-diphenylmethane diisocyanate, and mixtures thereof.

Preferred aromatic diisocyanates are toluene diisocyanate, 4,4'-diphenylmethane diisocyanate, and mixtures thereof.

The aromatic diisocyanates are preferably employed in an essentially pure state but may contain minor amounts (i.e., less than about 2 percent by weight) of other compounds such as ureas, amines, and traces of water and/or acid. The term "toluene diisocyanate" is meant to include 2,4-toluene diisocyanate, 2,6-toluene diisocyanate, or any combination of these isomers. Mixtures of the 2,4- and 2,6-isomers typically contain either 80 parts by weight 2,4-toluene diisocyanate and 20 parts by weight 2,6-toluene diisocyanate, or 65 parts by weight 2,4-toluene diisocyanate and 35 parts by weight 2,6-toluene diisocyanate.

Small amounts (i.e., 50 percent by weight or less) of aromatic monoisocyanates may also be used in conjunction with the aromatic diisocyanates in the preparation of the polycarbodiimides which are employed in the process of the present invention. These monoisocyanates act as chain stoppers and help control the molecular weight and viscosity of the resulting polycarbodiimides. The amount of aromatic monoisocyanate used depends upon the particular diisocyanate employed, but generally from about 20 to about 50, typically from about 25 to 45, and preferably from about 30 to about 40 percent by weight of the monoisocyanate and correspondingly generally from about 50 to about 80, typically from about 55 to about 75, and preferably from about 60 to about 70 percent by weight of diisocyanate based upon the total weight of the isocyanate compounds may be employed.

Aromatic monoisocyanates which may be used in this way include, for example, p-chlorophenyl isocyanate, m-chlorophenyl isocyanate, phenyl isoyanate, p-methoxyphenyl isocyanate, m-methoxyphenyl isocyanate, p-tolyl isocyanate, m-tolyl isocyanate, o-tolyl isocyanate, p-nitrophenyl isocyanate, m-nitrophenyl isocyanate, and mixtures thereof.

Phenyl isocyanate, p-chlorophenyl isocyanate, m-chlorophenyl isocyanate, and mixtures thereof are preferred monoisocyanates for use in the present invention.

Monoisocyanates alone may not be used to prepare the polycarbodiimides since polymeric carbodiimides would not result from the heating of monoisocyanates alone.

The polycarbodiimide is typically employed in the reinforced polyoxymethylene resin composition in an amount of from about 0.5 to 5 percent by weight based on the total weight of the composition, and more typically in an amount of from about 1 to 3 percent by weight based on the total weight of the composition. Amounts of polycarbodiimide of less than about 0.5 percent may require extensive mixing with the polyoxymethylene to achieve the desired improvement in physical properties whereas amounts of much greater than about 5 percent by weight may not significantly improve the physical properties over the lower amounts and tend to cause unacceptable discoloration of the compositions. Any of the polycarbodiimides included within the description set forth above may be used alone or in mixture with other of the polycarbodiimides to achieve the desired effect.

In a second aspect, or embodiment, according to the present invention, improved thermoplastic reinforced polyoxymethylene compositions are provided by the incorporation of both the polycarbodiimide and a specific high molecular weight phenoxy resin in the compositions. The phenoxy resins which may be utilized according to the invention are those described in U.S. Pat. No. 3,901,846. These resins are high molecular weight thermoplastic resins which are produced from 2,2'-bis(4-hydroxyphenyl)propane and epichlorohydrin according to the procedure as described in U.S. Pat. No. 3,356,646. The basic chemical structure of the phenoxy resins is similar to that of epoxy resins. They are, however, a separate and unique resin class, differing from epoxies in several important characteristics:

1. Phenoxy resins are tough and ductile thermoplastics. Their weight average molecular weight ranges from about 15,000 to 75,000, preferably from about 20,000 to 50,000 compared with 340 to 13,000 for conventional epoxies which crosslink on polymerization.

2. Phenoxy resins do not have terminal highly reactive epoxy groups and are thermally stable materials with a long shelf life.

3. The phenoxy resins can be used without further chemical conversion. They require no catalysts, curing agents or hardeners to be useful products while epoxy resins require catalysts, curing agents or hardeners to be useful.

The phenoxy resins utilized herein can be characterized by a repeating structure:

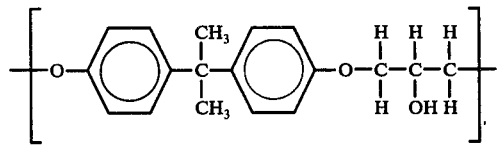

and have a weight average molecular weight range from about 15,000 to 75,000. As is obvious, the terminal structure is completed with hydrogen atoms or some suitable end capping groups.

The polycarbodiimide and phenoxy resin are typically incorporated in the reinforced polyoxymethylene compositions in a combined amount of from about 0.6 to 5 percent by weight based on the weight of the total composition, and more typically in an amount of from about 1 to 3 percent by weight based upon the total composition. Amounts of less than about 0.6 percent by weight for the combined weight of polycarbodiimide and phenoxy resin do not give the desired improvement or may require extensive mixing with the polyoxymethylene. Amounts much greater than about 5 percent by weight do not provide significantly greater improvements and thus do not appear to be warranted. The ratio of polycarbodiimide to phenoxy resin commonly will be in the range of from about 1:16 to 50:1. Preferably, the amount of polycarbodiimide employed is at least equal to the amount of phenoxy resin employed. When both the polycarbodiimide and the phenoxy resin are utilized, the minimum quantity of polycarbodiimide should be about 0.5 percent by weight based upon the total weight of the composition, and the minimum quantity of phenoxy resin should be about 0.1 percent by weight based upon the total weight of the composition.

The physical properties of composite articles prepared from reinforced polyoxymethylene compositions containing both the polycarbodiimide and the phenoxy resin tend to be significantly better than the physical properties of moldings produced from unmodified reinforced polyoxymethylene molding compositions and are also better than those of moldings prepared from reinforced polyoxymethylene molding compositions containing an amount of polycarbodiimide alone or of phenoxy resin alone (on a weight basis) equal to the total amount of the two combined additives. For a given amount of phenoxy resin the physical properties of the moldings appear to increase with an increasing amount of polycarbodiimide.

The polyoxymethylene, fibrous reinforcement, and polycarbodiimide and, in the second aspect of the invention, the phenoxy resin, may be mixed or blended in any convenient manner. Thus, for example, in a preferred embodiment the polycarbodiimide, or polycarbodiimide and phenoxy may be simultaneously intimately mixed with the reinforcing agent and the oxymethylene polymer. Mixing time involving the fibrous reinforcement should be kept to a minimum so as to avoid attrition of the fibrous reinforcement. For instance, mixing of all components may satisfactorily be carried out for 0.5 to 3 minutes (e.g., 1 to 2 minutes) while the components are present in a ZSK extruder provided at a melt temperature of about 400° to 405° F.

The reinforcing agents as utilized herein can be intimately mixed with the other components by either dry blending or melt blending, blending in extruders, heated rolls or other types of mixers. Also, the reinforcing agents can be blended with the monomers in the polymerization reaction as long as the polymerization reaction is not affected. The types of fibrous reinforcements which can be used are those generally known in the art for reinforcing thermoplastic molding resins and include among others, glass fibers (chopped strand or continuous rovings), asbestos fibers, cellulosic fibers, and synthetic fibers such as graphite fibers. Best results, however, with the polycarbodiimide and with the combination of the polycarbodiimide and phenoxy resin have been obtained with glass fiber reinforced polyoxymethylene compositions. The amount of reinforcing agent can range from about 2 to about 60 weight percent, and preferably 5 to 50 weight percent, based on the weight of the total molding composition.

The reinforced polyoxymethylene molding compositions of the invention, in addition to the polyoxymethylene polymer, reinforcing agent and polycarbodiimide and, if desired, the phenoxy resin, optionally may also include a minor quantity of additives conventionally employed in non-reinforced polyoxymethylene molding compositions both polymeric and non-polymeric, such as lubricity agents, dyes, and conventional antioxidants and acid scavengers.

A typical molding composition to which the additives according to the present invention are added may comprise, for example: 57 to 89.9 percent by weight polyoxymethylene, 10 to 40 percent by weight glass fiber, 0.1 to 2.0 percent by weight antioxidant, and 0.05 to 1.0 percent by weight acid scavenger. A preferred composition which may be modified according to the invention includes 69 to 79.8 percent by weight polyoxymethylene polymer, 20 to 30 percent by weight glass fiber, 0.15 to 0.5 percent by weight antioxidant, and 0.1 to 0.5 percent by weight acid scavenger. For instance, 72.9 parts by weight of a polyoxymethylene resin which incorporates 0.5 part antioxidant and 0.1 part acid scavenger can be mixed with 25 parts of glass fiber and 1.5 parts of the polycarbodiimide, or 71.4 parts by weight of a polyoxymethylene resin which incorporates 0.5 part antioxidant and 0.1 part acid scavenger can be mixed with 25 parts glass fiber, 1.5 parts by weight of the polycarbodiimide, and 1.5 parts by weight of the phenoxy resin. The exact composition chosen, however, will be dependent on the desired properties of the molded article as will be apparent to one of ordinary skill in the art.

Molded articles prepared from the thermoplastic reinforced polyoxymethylene molding compositions according to the invention shown a distinct improvement in physical properties as compared to articles prepared from the fiber reinforced polyoxymethylene which does not contain the polycarbodiimide or the polycarbodiimide and the phenoxy resin. For example, compositions containing from about 5 to 50% by weight glass and from about 0.5 to 5 percent by weight polycarbodiimide(based upon the total weight of the composition) commonly evidence up to a 75 percent increase in tensile strength and up to a 40 percent increase in Izod impact values.

The following examples will serve to further illustrate the invention without limiting the same.

EXAMPLES

Blends of (1) polyoxymethylene polymer, glass fibers, polycarbodiimide and (2) of polyoxymethylene polymer, glass fiber, polycarbodiimide and phenoxy as shown in the Table were prepared by feeding the materials to a ZSK extruder and compounding them for 1 to 2 minutes. The various compositions were thereafter molded into tensile bars on a 2½ oz. Stubbe molding machine under the following conditions:

| | |
|---|---|
| Cylinder Temperature | 410° F. |
| Mold Temperature | 180° F. |
| Cycle Times (Sec.) | |
| Injection | 10 |
| Cooling | 20 |
| Delay | 2 |
| Total | 32 |
| Screw (RPM) | 80 |
| Injection Pressure (psi) | 9,000 to 18,000 |

The polyoxymethylene polymer employed in the Examples was a polyoxymethylene copolymer prepared from trioxane and 2 percent by weight of ethylene oxide and had a weight average molecular weight of approximately 68,000. The oxymethylene polymer additionally was a polymer blend consisting of a 67 percent by weight portion which had been melt hydrolyzed in accordance with U.S. Pat. No. 3,318,848, and 33 percent by weight portion which had been solution hydrolyzed as described in U.S. Pat. No. 3,219,623. The polyoxymethylene polymer also had been "stabilized" or "prestabilized" prior to blending by employing a standard additive package and including 0.5 percent 2,2'-methylene-bis-(4-methyl-6-tertiary butyl phenol) antioxidant, and 0.1 percent cyanoguanidine acid scavenger. The glass fibers were chopped strands having a length of 3/16 inch and a diameter of 50 to 55 $\times$ 10$^{-5}$ inch. The glass fibers were sold commercially by Owens-Corning Fiberglas Corp. under the designation OCF 409.

As the additives there were employed a polycarbodiimide namely, poly(4,4'-diphenylmethane carbodiimide) having a number average molecular weight of about 5,000 (sold by the Upjohn Company and hereinafter described as PCDI), and a thermoplastic phenoxy resin prepared from epichlorohydrin and 2,2-bis(4-hydroxyphenyl)propane having a weight average molecular weight of about 30,000.

The physical properties of the moldings perpared from the blends according to the invention are included in the Table. For comparative purposes also are shown the physical properties of moldings made from blends similarly prepared but employing, instead of the polycarbodiimide or polycarbodiimide and phenoxy: (1) phenoxy alone, (2) a mixture of the polycarbodiimide and the diepoxide of the reaction product of 2,2'-bis(4-hydroxyphenyl)propane and epichlorohydrin having a number average molecular weight in the range of from 8,000 to 12,000 and sold under the mark EpiRez 560 (hereinafter described simply as the epoxy) and (3) methylene diphenyldiisocyanate (hereinafter described as MDI; employed heretofore to improve the physical properties of reinforced polyoxymethylene compositions but which is unsafe to use because of its toxicity).

TABLE

Comparative Properties of Glass Fiber Reinforced Polyoxymethylene Copolymer with Polycarbodiimide; Polycarbodiimide and Phenoxy; Polycarbodiimide and Epoxy; and MDI Additives

| | Example No. 1 | Example No. 2 | Example No. 3 | Example No. 4 | Example No. 5 |
|---|---|---|---|---|---|
| Composition | | | | | |
| Polyoxymethylene | 75% | 75% | 75% | 73.5% | 73.5% |
| Glass | 25% | 25% | 25% | 25% | 25% |
| PCDI | — | — | — | 1.5% | 1.5% |
| Phenoxy | — | — | — | — | — |
| Epoxy | — | — | — | — | — |
| MDI | — | — | — | — | — |
| Composite Properties | | | | | |
| Tensile Strength, psi | 8,740 | 10,500 | 10,500 | 17,200 | 16,700 |
| Tensile Modulus, $10^6$ psi | 0.996 | 1.13 | 1.13 | 1.19 | 1.15 |
| Elongation, percent | 4.65 | 2.24 | 2.27 | 2.72 | 2.57 |
| Flex. Str., psi | 15,100 | 15,700 | 15,800 | 25,100 | 24,000 |
| Flex. Mod., $10^6$ psi | 0.960 | 0.957 | 0.952 | 1.05 | 1.02 |
| Izod (notched) ft. lb./in. | 0.90 | 0.90 | 0.91 | 1.08 | 1.12 |
| Izod (reverse notched) | 4.64 | 4.92 | 4.46 | 8.86 | 7.88 |
| Rockwell Hardness (M) | 66 | 71 | 71 | 87 | 86 |

| | Example No. 6 | Example No. 7 | Example No. 8 | Example No. 9 | Example No. 10 |
|---|---|---|---|---|---|
| Composition | | | | | |
| Polyoxymethylene | 73.5% | 73.5% | 72% | 72% | 73.0% |
| Glass | 25% | 25% | 25% | 25% | 25% |
| PCDI | 1.5% | 1.5% | 3% | 3% | 0.75% |
| Phenoxy | — | — | — | — | 1.25% |
| Epoxy | — | — | — | — | — |
| MDI | — | — | — | — | — |
| Composite Properties | | | | | |
| Tensile Strength, psi | 17,700 | 16,700 | 16,500 | 17,100 | 16,800 |
| Tensile Modulus, $10^6$ psi | 1.19 | 1.15 | 1.17 | 1.19 | 1.19 |
| Elongation, percent | 2.62 | 2.57 | 2.63 | 2.72 | 2.53 |
| Flex. Str., psi | 25,200 | 24,000 | 23,500 | 24,800 | 24,000 |
| Flex. Mod., $10^6$ psi | 1.04 | 1.02 | 1.00 | 1.04 | 1.05 |
| Izod (notched) ft. lb./in. | 1.18 | 1.12 | 1.07 | 1.21 | 1.16 |
| Izod (reverse notched) | 8.92 | 7.88 | 7.23 | 8.46 | 8.73 |
| Rockwell Hardness (M) | 87 | 86 | 86 | 87 | 86 |

| | Example No. 11 | Example No. 12 | Example No. 13 | Example No. 14 | Example No. 15 |
|---|---|---|---|---|---|
| Composition | | | | | |
| Polyoxymethylene | 72.25% | 72.25% | 72.25% | 72% | 73.75% |
| Glass | 25% | 25% | 25% | 25% | 25% |
| PCDI | 1.5% | 1.5% | 1.5% | 1.5% | — |
| Phenoxy | 1.25% | 1.25% | 1.25% | 1.5% | 1.25% |
| Epoxy | — | — | — | — | — |
| MDI | — | — | — | — | — |
| Composite Properties | | | | | |
| Tensile Strength, psi | 17,400 | 17,200 | 17,300 | 18,000 | 14,300 |
| Tensile Modulus, $10^6$ psi | 1.19 | 1.20 | 1.12 | 1.22 | 1.07 |
| Elongation, percent | 2.78 | 2.80 | 2.86 | 2.70 | 2.29 |
| Flex. Str., psi | 25,200 | 25,200 | 25,100 | 25,200 | 20,700 |
| Flex. Mod., $10^6$ psi | 1.07 | 1.05 | 1.03 | 1.06 | 0.954 |
| Izod (notched) ft. lb./in. | 1.28 | 1.31 | 1.38 | 1.42 | 1.09 |
| Izod (reverse notched) | 9.92 | 9.92 | 11.0 | 10.05 | 7.50 |
| Rockwell Hardness (M) | 88 | 88 | 86 | 88 | 81 |

| | Example No. 16 | Example No. 17 | Example No. 18 | Exaple No. 19 | Example No. 20 | Example No. 21 |
|---|---|---|---|---|---|---|
| Composition | | | | | | |
| Polyoxymethylene | 73.75% | 73.5% | 72% | 72.0% | 73.5% | 73.5% |
| Glass | 25% | 25% | 25% | 25% | 25% | 25% |
| PCDI | — | — | — | 1.5% | — | — |
| Phenoxy | 1.25% | 1.5% | 3% | — | — | — |
| Epoxy | — | — | — | 1.5% | — | — |
| MDI | — | — | — | — | 1.5% | 1.5% |
| Composite Properties | | | | | | |
| Tensile Strength, psi | 14,400 | 15,000 | 13,900 | 14,600 | 19,900 | 19,500 |
| Tensile Modulus, $10^6$ psi | 1.16 | 1.19 | 1.14 | 1.20 | 1.26 | 1.19 |
| Elongation, percent | 2.10 | 2.01 | 1.91 | 2.00 | 3.45 | 3.31 |
| Flex. Str., psi | 19,400 | 20,000 | 18,800 | 20,800 | 29,900 | 28,800 |
| Flex. Mod., $10^6$ psi | 0.976 | 0.993 | 0.966 | 1.02 | 1.08 | 1.05 |
| Izod (notched) ft. lb./in. | 1.0 | 1.16 | 1.05 | 0.84 | 1.85 | 1.75 |
| Izod (reverse notched) | 6.48 | 6.50 | 6.09 | 6.08 | 12.43 | 10.32 |

| | TABLE-continued | | | | |
|---|---|---|---|---|---|
| Comparative Properties of Glass Fiber Reinforced Polyoxymethylene Copolymer with Polycarbodiimide; Polycarbodiimide and Phenoxy; Polycarbodiimide and Epoxy; and MDI Additives | | | | | |
| Rockwell Hardness (M) 82 | 83 | 83 | 86 | 86 | 87 |

The comparative results show that the polycarbodiimide provides vastly improved physical properties over the control containing no additives and which are better than those provided by the use of phenoxy resin alone. The combined use of the polycarbodiimide and phenoxy resin tends to provide improvements greater than that achieved through the use of either additive alone and greater than that provided by the combined use of the polycarbodiimide and the epoxy. Moldings prepared from the compositions according to the present invention show slightly less improvement than those prepared from compositions containing the MDI additive but without the toxicity problems inherent in the use of MDI. Additionally, the compositions according to the invention require molding conditions similar to those required for compositions including only the phenoxy additive. Higher molding pressures, however, are required for MDI modified compositions.

Similar outstanding results are obtained employing other polyoxymethylenes, polycarbodiimides and phenoxy resins within the scope of the invention as defined above.

In commonly assigned U.S. Ser. No. 846,661, filed concurrently herewith of Robert Edelman, entitled "Production of An Improved Non-Reinforced Polyoxymethylene Molding Composition Which Forms Reduced Mold Deposits Upon Molding" is claimed a process for forming a non-reinforced polyoxymethylene molding composition wherein a small amount of a certain polycarbodiimide serves a non-analogous role (i.e., elimination of mold deposit) than that of the polycarbodiimide in the present composition.

Although the invention has been described in conjunction with certain preferred embodiments, it is not limited thereto but instead includes all those embodiments within the scope and spirit of the appended claims.

We claim:

1. An improved fiber reinforced polyoxymethylene molding composition capable of forming composite articles exhibiting improved physical properties comprising an admixture of (1) a polyoxymethylene polymer, (2) about 2 to 60 percent by weight based on the total weight of the composition of a fibrous reinforcement, and (3) about 0.5 to 5 percent by weight based on the total weight of the composition of a polycarbodiimide which is (a) derived from an aromatic isocyanate which is unsubstituted or substituted with up to one methyl group per aromatic ring and (b) contains at least three carbodiimide units per polycarbodiimide molecule.

2. The improved fiber reinforced polyoxymethylene molding composition of claim 1 wherein the fibrous reinforcement is glass fiber in an amount of about 5 to 50 percent by weight based on the total weight of the composition.

3. The improved fiber reinforced polyoxymethylene molding composition of claim 2 wherein the polyoxymethylene polymer has an inherent viscosity of at least 0.8 (measured at 60° C. in a 0.1 weight percent solution in p-chlorophenol containing 2 weight percent of alpha-pinene), a weight average molecular weight of at least 35,000, and a melting point of at least 150° C.

4. The improved fiber reinforced polyoxymethylene molding composition of claim 3 wherein the polyoxymethylene polymer is a copolymer comprising about 60 to about 99.6 mole percent recurring —$OCH_2$— groups.

5. The improved fiber reinforced polyoxymethylene molding composition of claim 4 wherein the polyoxymethylene polymer has been pre-stabilized by melt hydrolysis prior to admixture with components (2) and (3).

6. The improved fiber reinforced polyoxymethylene molding composition of claim 4 wherein the polyoxymethylene polymer is pre-stabilized by the addition of an antioxidant and an acid scavenger.

7. The improved fiber reinforced polyoxymethylene molding composition of claim 6 wherein said antioxidant is 2,2'-methylene-bis-(4-methyl-6-tertiary butyl phenol), and said acid scavenger is cyanoguanidine.

8. The improved fiber reinforced polyoxymethylene molding composition of claim 4 wherein said polycarbodiimide is selected from the group consisting of poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), and mixtures thereof.

9. The improved fiber reinforced polyoxymethylene molding composition of claim 2 wherein the polyoxymethylene polymer is a mixture of a melt hydrolysis stabilized polymer and a solution hydrolysis stabilized polymer.

10. An improved fiber reinforced polyoxymethylene molding composition capable of forming composite articles exhibiting improved physical properties comprising an admixture of (1) a polyoxymethylene polymer, (2) about 2 to 60 percent by weight based on the total weight of the composition of a fibrous reinforcement, and (3) about 0.6 to 5 percent by weight based on the total weight of the composition of a polycarbodiimide which is (a) derived from an aromatic isocyanate which is unsubstituted or substituted with up to one methyl group per aromatic ring and (b) contains at least three carbodiimide units per polycarbodiimide molecule, and a high molecular weight thermoplastic phenoxy resin; the weight ratio of the polycarbodiimide to phenoxy resin being in the range of 1:16 to 50:1.

11. The improved fiber reinforced polyoxymethylene molding composition of claim 10 wherein the phenoxy resin has the repeating structure:

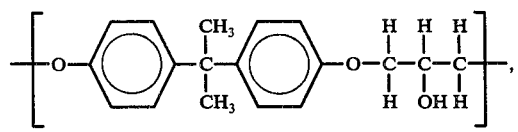

and a weight average molecular weight of from about 15,000 to 75,000.

12. The improved fiber reinforced polyoxymethylene molding composition of claim 11 wherein the fibrous reinforcement in glass fiber in an amount of about 5 to 50 percent by weight based on the total weight of the composition.

13. The improved fiber reinforced polyoxymethylene molding composition of claim 12 wherein the polyoxymethylene polymer has an inherent viscosity of at least 0.8 (measured at 60° C. in a 0.1 weight percent solution in p-chlorophenol containing 2 weight percent of alpha-pinene), a weight average molecular weight of at least 35,000, and a melting point of at least 150° C.

14. The improved fiber reinforced polyoxymethylene molding composition of claim 13 wherein the polyoxymethylene polymer is a copolymer comprising about 60 mole to about 99.6 mole percent of recurring —OCH$_2$— groups.

15. The improved fiber reinforced polyoxymethylene molding composition of claim 14 wherein the polyoxymethylene polymer has been pre-stabilized by melt hydrolysis prior to admixture with components (2) and (3).

16. The improved fiber reinforced polyoxymethylene molding composition of claim 14 wherein the polyoxymethylene polymer is pre-stabilized by the addition of an antioxidant and an acid scavenger.

17. The improved fiber reinforced polyoxymethylene molding composition of claim 16 wherein said antioxidant is 2,2'-methylene-bis-(4-methyl-6-tertiary butyl phenol), and said acid scavenger is cyanoguanidine.

18. The improved fiber reinforced polyoxymethylene molding composition of claim 14 wherein said polycarbodiimide is selected from the group consisting of poly(tolyl carbodiimide), poly(4,4'-diphenylmethane carbodiimide), poly (3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), and mixtures thereof.

19. The improved fiber reinforced polyoxymethylene molding composition of claim 12 wherein the polyoxymethylene polymer is a mixture of a melt hydrolysis stabilized polymer and a solution hydrolysis stabilized polymer.

20. A fiber reinforced injection molded polyoxymethylene composite article exhibiting improved physical properties formed from the molding composition of claim 1.

* * * * *